United States Patent
Palin et al.

(10) Patent No.: US 9,363,840 B2
(45) Date of Patent: Jun. 7, 2016

(54) APPLICATION BASED CONNECTIVITY EVENT TRIGGERING

(75) Inventors: Arto Palin, Viiala (FI); Jukka Reunamäki, Tampere (FI); Tommy Ginman, Masala (FI)

(73) Assignee: Nokia Technologies Oy, Espoo (FI)

( * ) Notice: Subject to any disclaimer, the term of this patent is extended or adjusted under 35 U.S.C. 154(b) by 44 days.

(21) Appl. No.: 14/373,868

(22) PCT Filed: Mar. 7, 2012

(86) PCT No.: PCT/FI2012/050223
§ 371 (c)(1),
(2), (4) Date: Jul. 22, 2014

(87) PCT Pub. No.: WO2013/132134
PCT Pub. Date: Sep. 12, 2013

(65) Prior Publication Data
US 2014/0335792 A1    Nov. 13, 2014

(51) Int. Cl.
H04W 4/02 (2009.01)
H04W 76/02 (2009.01)
H04W 8/00 (2009.01)
H04W 4/00 (2009.01)
H04W 4/20 (2009.01)
H04W 4/08 (2009.01)

(52) U.S. Cl.
CPC ............ *H04W 76/023* (2013.01); *H04W 4/008* (2013.01); *H04W 4/023* (2013.01); *H04W 4/08* (2013.01); *H04W 4/20* (2013.01); *H04W 8/005* (2013.01)

(58) Field of Classification Search
CPC ...... H04W 4/008; H04W 4/023; H04W 8/005
See application file for complete search history.

(56) References Cited

U.S. PATENT DOCUMENTS

| | | | |
|---|---|---|---|
| 7,775,432 B2 | 8/2010 | Jalkanen et al. | |
| 2005/0136845 A1 | 6/2005 | Masuoka et al. | |
| 2011/0281519 A1 | 11/2011 | Reuss et al. | |
| 2011/0317586 A1 | 12/2011 | Palanki et al. | |
| 2012/0249285 A1* | 10/2012 | Levien ................... | H04L 67/06 340/3.1 |

(Continued)

FOREIGN PATENT DOCUMENTS

| | | |
|---|---|---|
| EP | 1450517 | 8/2004 |
| EP | 1612999 A1 | 1/2006 |

(Continued)

OTHER PUBLICATIONS

"Specification of the Bluetooth System", Bluetooth Specification v4.0, Jun. 30, 2010, 2302 pages.

(Continued)

*Primary Examiner* — David Bilodeau
(74) *Attorney, Agent, or Firm* — Nokia Technologies Oy (57) ABSTRACT

In accordance with an example embodiment of the present invention, an apparatus, a computer program product and a method is provided for application based connectivity event triggering. The example embodiment comprises determining, at an apparatus, whether an active application satisfies predefined criteria for connectivity event, and triggering a radio module at the apparatus to enter into a device discovery mode for transmitting device discovery messages in response to determining that the apparatus is actively operating an application satisfying the predefined criteria for connectivity event.

16 Claims, 7 Drawing Sheets

(56) References Cited

U.S. PATENT DOCUMENTS

| | | | |
|---|---|---|---|
| 2012/0289157 A1 | 11/2012 | Palin et al. | |
| 2013/0331031 A1* | 12/2013 | Palin | H04W 52/0245 455/41.2 |
| 2014/0057566 A1* | 2/2014 | Watfa | H04W 48/16 455/41.2 |
| 2014/0194062 A1* | 7/2014 | Palin | H04W 4/008 455/41.2 |
| 2014/0194115 A1* | 7/2014 | Yang | H04W 4/008 455/426.1 |

FOREIGN PATENT DOCUMENTS

| | | |
|---|---|---|
| EP | 2073514 A2 | 6/2009 |
| EP | 2416617 | 2/2012 |

OTHER PUBLICATIONS

"Baseband", Bluetooth Technology Special Interest Group, Retrieved on Sep. 23, 2014, Webpage available at : https://www.bluetooth.org/en-us/specification/assigned-numbers/baseband.

Service Discovery, Bluetooth Technology Special Interest Group, Retrieved on Sep. 23, 2014, Webpage available at : https://www.bluetooth.org/en-us/specification/assigned-numbers/service-discovery.

Extended European Search Report received for corresponding European Patent Application No. 12870539.9, dated Jun. 26, 2015, 11 pages.

"Wi-Fi Peer-to-Peer (P2P) Technical Specification v1.2", Wifi Alliance, Wi-Fi Alliance Technical Committee P2P Task Group, v1.2, 2010, 159 pages.

International Search Report and Written Opinion received for corresponding Patent Cooperation Treaty Application No. PCT/FI2012/050223 , dated Nov. 28, 2012, 10 pages.

International Preliminary Report on Patentability received for corresponding Patent Cooperation Treaty Application No. PCT/FI2012/050223 , dated May 13, 2014, 6 pages.

* cited by examiner

APPLICATION BASED CONNECTIVITY EVENT TRIGGERING

RELATED APPLICATION

This application was originally filed as PCT Application No. PCT/FI2012/050223 filed Mar. 7, 2012.

TECHNICAL FIELD

The present application relates generally to wireless communication, more particularly to triggering actions relating to connection establishment based on active application.

BACKGROUND

Modern society has adopted, and is becoming reliant upon, wireless communication devices for various purposes, such as, connecting users of the wireless communication devices with other users. Wireless communication devices can vary from battery powered handheld devices to stationary household and/or commercial devices utilizing an electrical network as a power source. Due to rapid development of the wireless communication devices a number of areas capable of enabling entirely new types of communication applications have emerged.

In order to communicate with another device, a wireless communication device needs to first detect the other device to which a communication connection is preferred. After device detection, a wireless communication link may be established between the devices. While established wireless communication links allow devices to exchange information, setting the devices to device detection state in order to initiate device discovery for establishing of the wireless communication link typically requires user input.

SUMMARY

Various aspects of examples of the invention are set out in the claims.

According to a first aspect of the present invention, a method is provided comprising determining, at an apparatus, whether an active application satisfies predefined criteria for connectivity event, and triggering a radio module at the apparatus to enter into a device discovery mode for transmitting device discovery messages in response to determining that the apparatus is actively operating an application satisfying the predefined criteria for connectivity event.

According to a second aspect of the present invention, a computer program product is disclosed, adapted to cause performing of the method according to the first aspect when said program is run on a computer.

According to a third aspect of the present invention, an apparatus is disclosed, comprising means for determining whether an active application satisfies predefined criteria for connectivity event, and means for triggering a radio module within the apparatus to enter into a device discovery mode for transmitting device discovery messages in response to determination that the apparatus is actively operating an application satisfying the predefined criteria for connectivity event.

According to a fourth aspect of the present invention, an apparatus is disclosed, comprising at least one processor; and at least one memory including executable instructions, the at least one memory and the executable instructions being configured to, in cooperation with the at least one processor, cause the apparatus to perform at least the following: Determine whether an active application satisfies predefined criteria for connectivity event; and trigger a radio module to enter into a device discovery mode for transmitting device discovery messages in response to the determination that the apparatus is actively operating an application satisfying the predefined criteria for connectivity event.

According to fifth aspect of the present invention, a computer program product code is disclosed, the computer program product comprising computer executable code recorded on a non-transitory computer readable storage medium comprising code configured to determine whether an active application satisfies predefined criteria for connectivity event; and code configured to trigger a radio module of an apparatus to enter into a device discovery mode for transmitting device discovery messages in response to determination that the apparatus is actively operating an application satisfying the predefined criteria for connectivity event.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

Example embodiments of the present invention and their potential effects are understood by referring to FIGS. 1 through 8 of the drawings.

Figure 1:
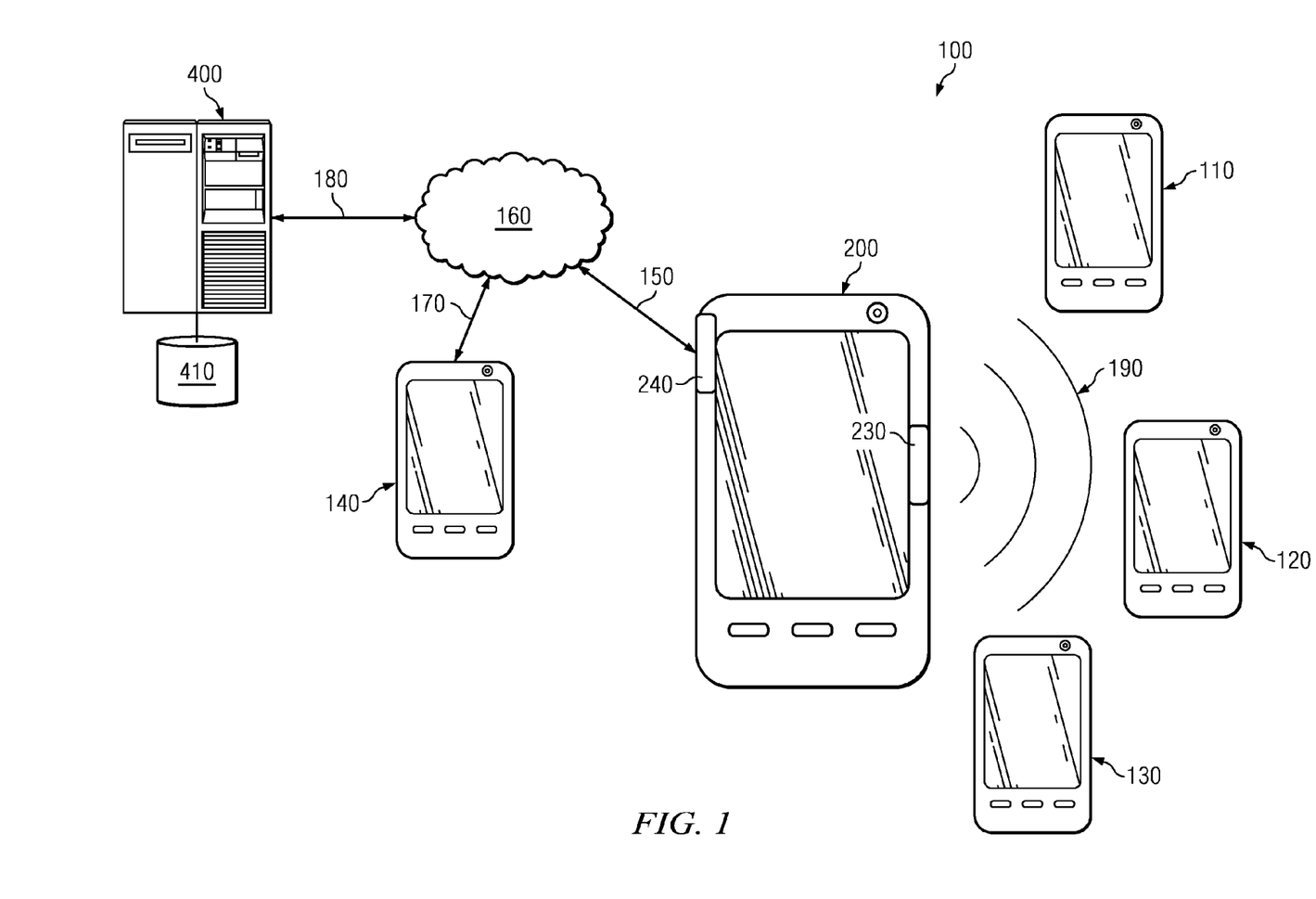
FIG. 1 discloses an example of operational environment in which apparatuses according to an example embodiment of the invention may be used.

FIG. 1 discloses an example of operational environment 100 in which various apparatuses according to an example embodiment of the invention may be used. An apparatus 200, for example a personal computer, an engineering workstation, a personal digital assistant, a portable computer, a computerized watch, a wired or wireless terminal, mobile phone, node, and/or the like, a set-top box, a personal video recorder (PVR), an automatic teller machine (ATM), a game console, or the like is shown having short-range communication means, such as a short-range communications interface 230, configured to communicate wirelessly with various short-range communication devices, such as devices 110, 120 and 130 via a short-range communication connection. Short-range communication connections may be used for the exchange of information over a local area varying for example from a couple of meters to some hundred of meters. Examples of wireless short-range communication technologies comprise Bluetooth™, Bluetooth™ Low Energy, WLAN, wireless universal serial bus (WUSB), ultra-wideband (UWB), ZigBee (802.15.4, 802.15.4a), and ultra high frequency radio-frequency identification (UHF RFID) technologies. Apparatus 200 may further be embodied as a portable wireless communications device equipped with wide-area communication means, such as long-range communications interface 240 to connect with network 160 via a wireless communication link 150 to communicate for example either with a wireless communication device 140, or with a remote server 400 as illustrated in FIG. 1.

Depending on the embodiment, the wireless communication link 150 may be provided over a wide-are communication connection. Examples of wireless wide-area communication technologies comprise $2^{nd}$ generation (2G) digital cellular networks, for example Global System for Mobile Communications (GSM) that operates in the 900 MHz/1.8 GHz bands in Europe and in the 850 MHz and 1.9 GHz bands in the United States. Wide-area communication technologies may further comprise general packet radio service (GPRS) technology, universal mobile telecommunications system (UMTS) technology, code division multiple access (CDMA) technologies, 3GPP Long Term Evolution (LTE) technologies, and/or the like.

According to an alternative example embodiment, link 150 may be provided with a wired connection. Examples of wired communication technologies include ethernet, IEEE 1394, universal serial bus (USB) protocol, any other serial or parallel wired connection, and/or the like. Network 160 may be either a wireless network, or a wired network. Network 160 may further be connected to other networks. According to a further example embodiment, apparatus 200 may be a stationary device having a wireless and/or a wired interface for communicating with network 160.

As further shown in FIG. 1 various other devices, such as other mobile device 140 and server 400 including a database 410 may be connected to the network 160 via respective links (170 and 180) so that apparatus 200 may communicate with any of the other devices via the network 160.

According to one example, apparatus 200, such as a wireless communication device, before actually initiating a wireless short-range communication with one or more other wireless communication devices, such as any of the devices 110, 120 or 130 through a wireless short-range communication link 190, needs to first perform device discovery to detect one or more of the devices 110, 120 and 130 within it's short-range communication coverage. After device discovery and selection, apparatus 200 may proceed with short-range communication link establishment in order to commence communication with one or more of the detected devices.

Figure 2:
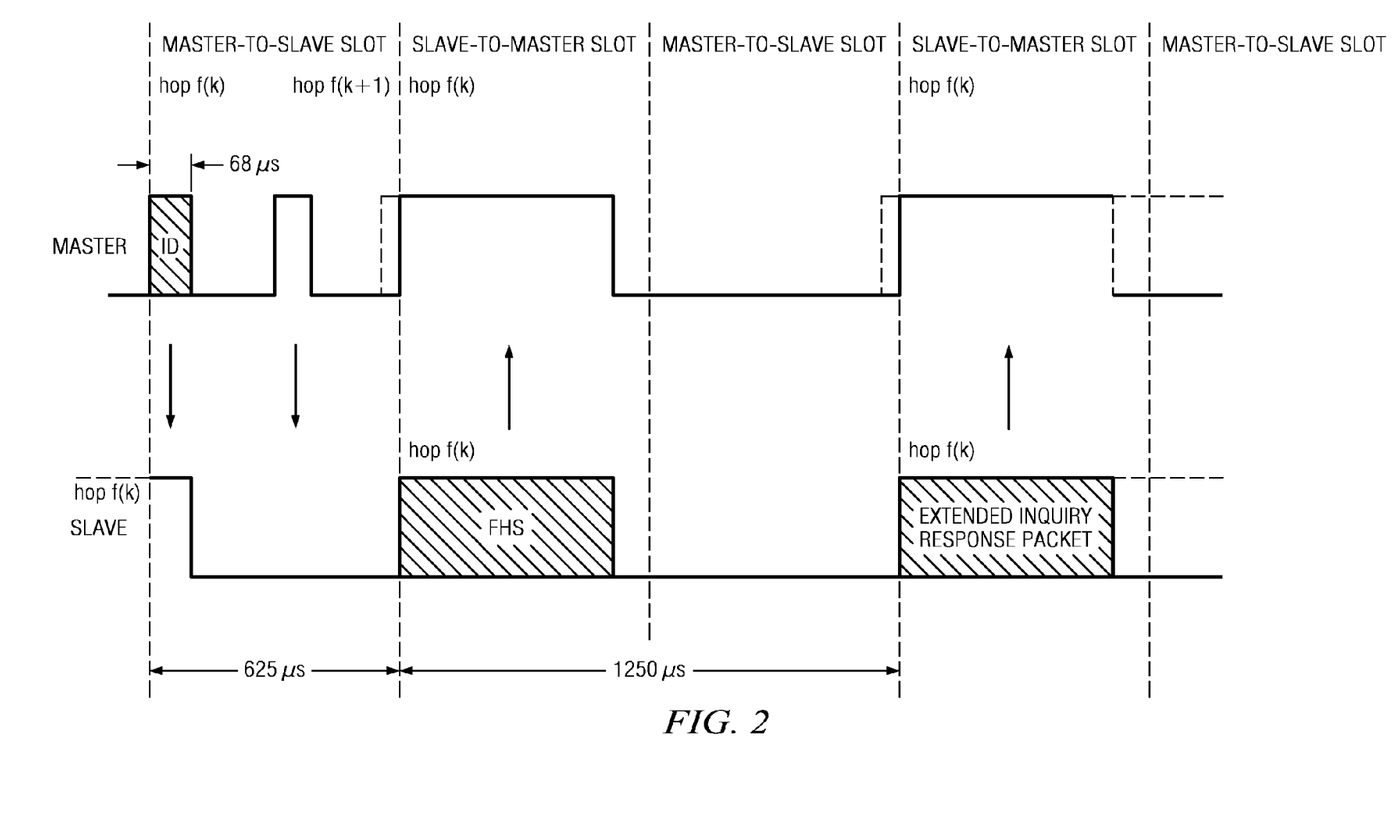
FIG. 2 illustrates an example Bluetooth™ communication protocol based device discovery with Extended Inquiry Response (EIR) procedure usable in accordance with at least one example embodiment.

An example device discovery scenario usable in accordance with at least one example embodiment of the present invention is illustrated in FIG. 2. This example discloses Bluetooth™ communication protocol based device discovery with Extended Inquiry Response (EIR) procedure. It should be noted that Bluetooth™ communication protocol in this context is intended to be used only as an example, and thus, other wireless communication protocols may be employed in implementing one or more embodiments of the present invention. Initially an apparatus, such as apparatus 200 of FIG. 1, may be configured to perform a Bluetooth™ Inquiry, i.e. trying to detect other Bluetooth™ devices within its coverage, by transmitting one or more ID packets. These ID packets transmitted by the apparatus do not contain any information about the source or recipient of the transmissions. However, the packets may indicate which class of devices should respond. *Bluetooth™ Core Specification, version* 4.0, published on Jun. 30, 2010 provided by Bluetooth™ Special Interest Group (SIG) accessible at www.bluetooth.org defines one general inquiry access code (GIAC) to inquire for any type of device, and multiple dedicated inquiry access codes (DIAC) that only inquire for certain type of device to respond to the ID packet.

Bluetooth™ Inquiry procedure may be performed in order to find discoverable Bluetooth™ devices within transmission range. As shown in FIG. 2, Inquiring device is a Master and any responding device is a Slave. Default duration of a Bluetooth™ Inquiry scan is 11.25 ms when performing a standard scan and 22.5 ms when performing an interlaced scan. Default value for a Bluetooth™ Inquiry scan interval is 2.56 s. In the example of FIG. 2, the master-to-slave slot duration is 625 μs, and the total master-to-slave and slave-to-master slot duration is 1250 μs. Apparatuses in a discoverable mode that receive Bluetooth™ Inquiry packets, such as one or more ID packets that typically have a duration of 68 μs, may transmit a response including a Frequency Hop Synchronization (FHS) packet.

As illustrated on the example Bluetooth™ communication protocol based device discovery with Extended Inquiry Response (EIR) of FIG. 2, an Extended Inquiry Response (EIR) packet may be transmitted by the responding device subsequent to the transmission of the FHS packet. The EIR packet may contain miscellaneous information in addition to what is delivered in the basic inquiry response (i.e. FHS packet). EIR packets may comprise information regarding, for example, services offered by the apparatus or some vendor specific information. The impending transmission of an EIR packet may be indicated by an EIR indicator bit that is set in the FHS packet. If it is indicated in the FHS packet that an EIR packet follows (i.e., the EIR bit is set), transmission of the EIR packet transmission initiates in the next slave-to-master slot. EIR packets may be asynchronous connectionless link (ACL) packets of type DM1, DM3, DM5, DH1, DH3 or DH5.

Figure 3:
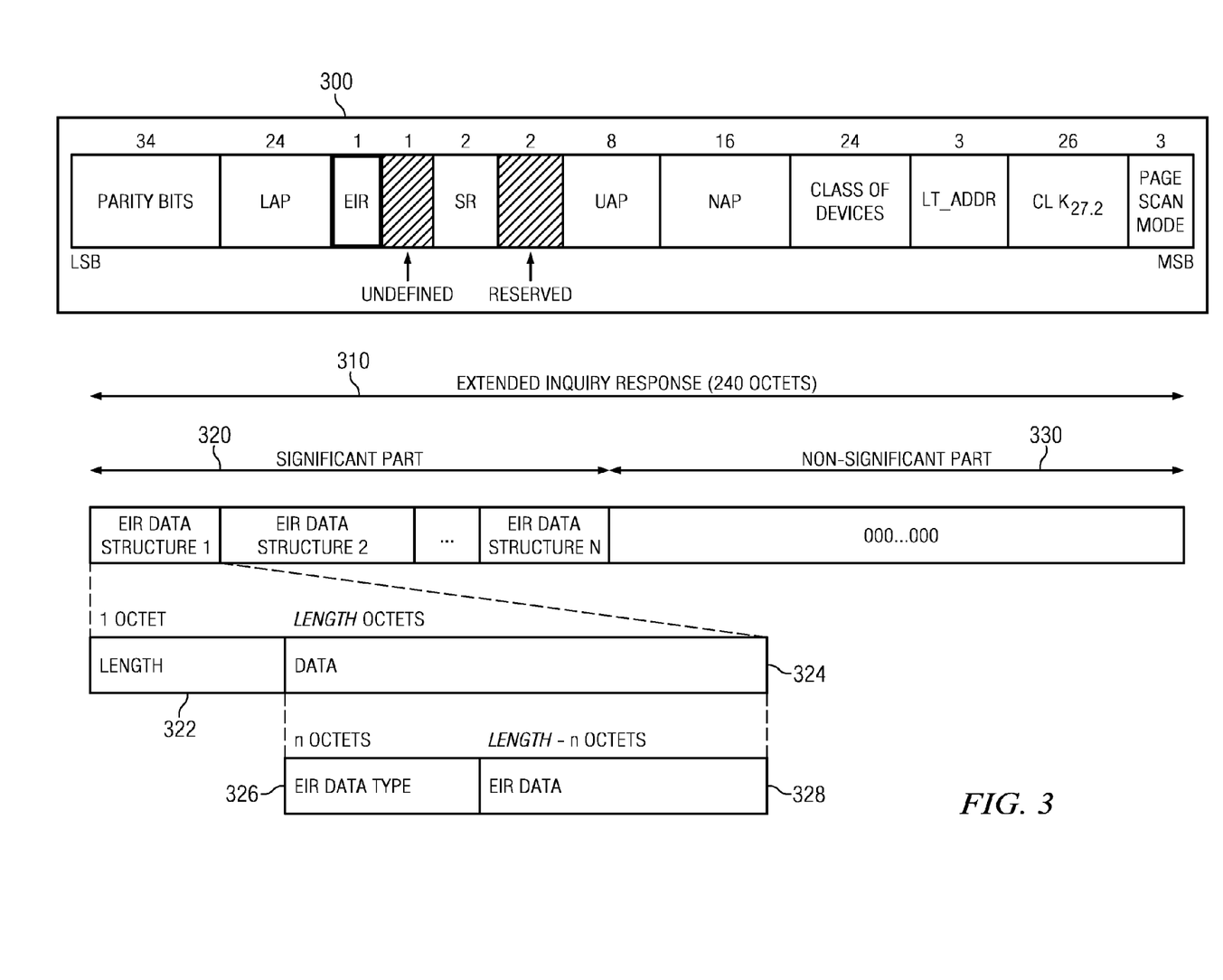
FIG. 3 illustrates example data formats of information included in Frequency Hopping Synchronization (FHS) and Extended Inquiry Response (EIR) packets, usable in accordance with at least one example embodiment.

Example data format included in a FHS packet usable e.g. in connection with the example Bluetooth™ communication protocol based device discovery with Extended Inquiry Response (EIR) of FIG. 2, includes various elements as defined in the existing *Bluetooth™ Core Specification, version* 4.0, published on Jun. 30, 2010 provided by Bluetooth™ Special Interest Group (SIG), accessible at www.bluetooth.org. FIG. 3 illustrates data elements of an example FHS packet 300 usable in connection with the example Bluetooth™ communication protocol comprising at least a Bluetooth Device Address (BD_ADDR), which is formed of three address parts, Lower Address Part (LAP), Upper Address Part (UAP) and Non-significant Address Part (NAP), device class (CoD), indication whether an Extended Inquiry Response (EIR) follows the FHS packet, Bluetooth™ Page scan mode and clock phase. The Upper Address Part (UAP) and Non-significant Address Part (NAP) of the Bluetooth Device Address form identification of a manufacturing company of a Bluetooth device. The class of device (CoD) field defines the kind of device that is responding. As an example, the responding device's major class may be audio device and minor class wearable headset device. Full description of the class of device information is provided by the Bluetooth Special Interest Group and accessible e.g. at: https://www.bluetooth.org/Technical/AssignedNumbers/baseband.htm.

An example data format of an EIR packet usable e.g. in connection with the example Bluetooth™ communication protocol based device discovery with Extended Inquiry Response (EIR) of FIG. 2 includes various elements as defined in the existing *Bluetooth™ Core Specification, version* 4.0, published on Jun. 30, 2010 provided by Bluetooth™ Special Interest Group (SIG), accessible at www.bluetooth.org. FIG. 3 illustrates data format of an example EIR packet 310, which includes 240 octets of data and comprises a significant part 320 and a non-significant part 330. The significant part 320 of the example EIR packet 310 contains a sequence of data structures. Each data structure have a length field 322 of one octet, which contains a length value for associated data field 324, and the data field 324 consisting payload for a number of octets corresponding to the length value of the length field 322. The first n octets 326 of the data field contain the extended inquiry response (EIR) data type. The content of the remaining length−n octets 328 in the data field depends on the value of the EIR data type and contains EIR data. The non-significant part 330 of the EIR packet 310 extends the extended inquiry response to 240 octets and contains all-zero octets. The example EIR packet 310 may include various information regarding the responding device, such as information regarding supported service classes, name information and transmission power level of the responding device. The complete list of service classes is provided by the Bluetooth Special Interest Group and accessible e.g. from here: https://www.bluetooth.org/Technical/AssignedNumbers/service_discove.htm.

Figure 4:
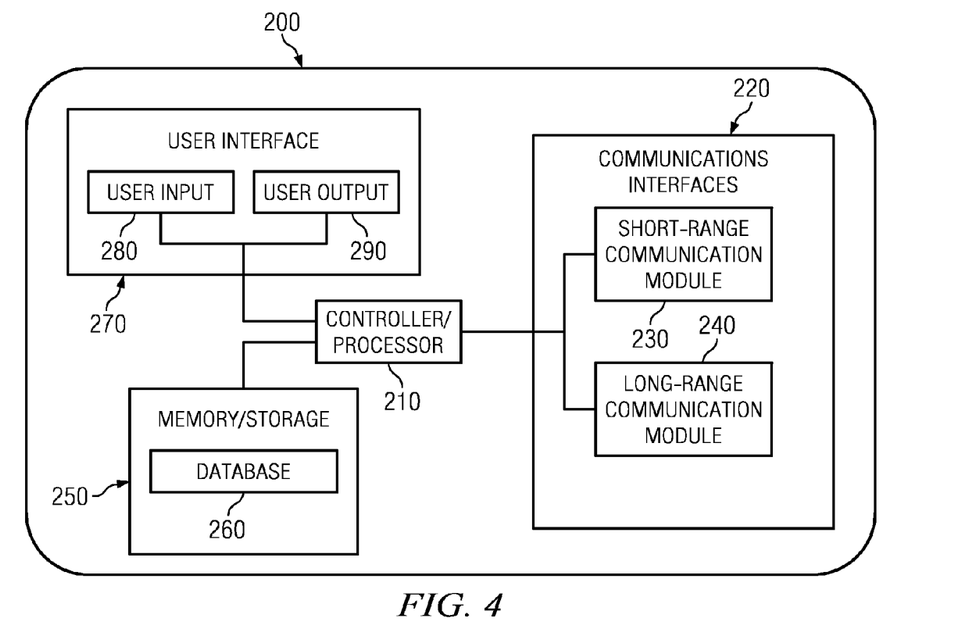
FIG. 4 discloses a modular layout for an example apparatus according to an example embodiment of the present invention.

FIG. 4 discloses a modular layout for an example apparatus according to an example embodiment of the present invention. In FIG. 4, apparatus 200 of FIG. 2 is broken down into modules configured to cause the apparatus to perform various functionalities. The functionalities may be provided by various combinations of the software and/or hardware components discussed below according to an embodiment of the present invention.

Control module 210 is configured to regulate operation of the apparatus 200. The control module may be embodied as a controlling means, for example as a controlling circuitry or a processor. Inputs for the control module 210 may be received from various other modules comprised within apparatus 200. For example, user interface 270 may provide input to the control module 210 in response to receiving input from a user via user input 280. So, user input received via the user interface 270 may be used as an input in the control module 210 for controlling the operation of the apparatus 200. Control module 210 may interpret and/or process the input data and, in response, may issue one or more control commands to at least one of the other modules within apparatus 200.

In accordance with an example embodiment, apparatus 200, embodied for example as a wireless communication device, comprises communications interfaces 220. Communications interfaces 220 may incorporate one or more communication modules of the apparatus 200. In an example embodiment, the communications interfaces 220 may comprise means for wired and/or wireless communication. As shown in the example of FIG. 4, communications interfaces 220 may comprise a short-range communications module 230 and a long-range communications module 240. It should be understood that although FIG. 4 illustrates only one short-range communication module 230 and one long-range communication module 240 for the sake of clarity, apparatus 200 may comprise any number of further communications modules. For example, two or more additional wired and/or wireless communication modules may be included in the apparatus 200. Apparatus 200 may utilize one or more of these modules to receive information from both local and long distance sources, and to transmit data to local or remote recipient devices from apparatus 200. Communications interfaces 220 may be activated by control module 210, or by control resources local to the sub-modules responding to received messages, environmental influences and/or other devices in communication with the apparatus 200.

Short-range wireless networks provide communication solutions that avoid some of the problems seen in large cellular networks. Bluetooth™ is an example of a short-range wireless technology quickly gaining acceptance in the marketplace. Bluetooth™ enabled wireless communication device may transmit and receive data rates from 720 Kbps up to 2-3 Mbps within a range of 10 meters, and may transmit up to 100 meters with additional power boosting. A user does not actively instigate a Bluetooth™ network. Instead, a plurality of devices within operating range of each other will automatically form a network group called a "piconet". Any device may promote itself to the master of the piconet, allowing it to control data exchanges with up to seven "active" slaves and 255 "parked" slaves. Active slaves exchange data based on the clock timing of the master. Parked slaves monitor a beacon signal in order to stay synchronized with the master, and wait for an active slot to become available. These devices continually switch between various active communication and power saving modes in order to transmit data to other piconet members. In addition to Bluetooth™ and Bluetooth™ Low Energy, other popular short-range wireless networks include WLAN (of which "Wi-Fi" local access points communicating in accordance with the IEEE 802.11 standard, is an example), WUSB, UWB, ZigBee (802.15.4, 802.15.4a), and UHF RFID. All of these wireless mediums have features and advantages that make them appropriate for various applications.

Short-range communication module 230 may comprise short-range communication interface embodied for example as a transmitter and/or receiver for exchanging information across short-range wireless network using a short-range communication protocol. Example communication protocols for short-range communication may comprise Bluetooth™, Bluetooth™ Low Energy, wireless local area network (WLAN), ultra-wide band (UWB), and wireless universal serial bus (WUSB) technologies. Bluetooth™ Low Energy communication protocol provides a security enhancing feature for creating temporary identification information that may be used to mask actual identification of the wireless communication device. The temporary identification information may be used by other devices in communicating with the apparatus 200. However, only other devices possessing secret address component information may determine the actual identity of the masked wireless communication device. The temporary identification information may further be recompiled when a threshold condition is satisfied.

Long-range communication module 240 may comprise a long-range communications interface configured to communicate and exchange information over a long distance in a large geographic area using any of the wide-area communication technologies described earlier. Examples of wireless long-range communication technologies comprise $2^{nd}$ generation (2G) digital cellular networks, for example Global System for Mobile Communications (GSM) that may communicate in the 900 MHz/1.8 GHz bands in Europe and in the 850 MHz and 1.9 GHz bands in the United States. Long-range communication technologies may further comprise general packet radio service (GPRS) technology, universal mobile telecommunications system (UMTS) technology, code division multiple access (CDMA) technologies, and/or the like. Long-range communication technologies may also operate to transmit and receive messages, such as text messages via a short messaging service (SMS), and/or multimedia content via multimedia messaging service (MMS) messages. Long-range communication technologies may provide voice and data services.

As a subset of long-range communications module 240, or alternatively operating as an independent module separately coupled to processor 210, the apparatus 200 may comprise a broadcast receiver. The broadcast receiver may be a digital audio- or video receiver, for example a digital audio broadcasting (DAB) or a digital video broadcasting (DVB) receiver, and/or the like. According to an example embodiment, the broadcast receiver comprises a Digital Video Broadcast for Handheld Apparatuses (DVB-H) receiver. The broadcasting transmissions may be encoded so that only certain apparatuses may access the transmitted content. The broadcast transmission may comprise text, audio and/or video information, and data. In an example embodiment, apparatus 200 may receive broadcasts and/or information within the broadcast signal to determine if the apparatus is permitted to view the received content.

According to one example embodiment either the short-range communications module 230, or the long-range communications module 240 may be equipped with a wired interface that may be used for communicating with another device using a wired communication protocol via an interface such as Ethernet, an IEEE 1394 communication interface, a universal serial bus (USB) interface, and/or the like.

User interface 270 may include visual, audible and/or tactile elements which allow a user to receive data from, and enter data into, the apparatus. Data entered by a user is received via user input module 280 and may be interpreted by control module 210, for example to affect the behavior of apparatus 200. User-inputted data may also be transmitted via any of the communication modules of the communications interfaces 220 to another device. Information may also be received by other devices at the apparatus 200 via communications interfaces 220. Control module 210 may cause this information to be transferred to user interface 270 for presentation to the user via user output module 290. User interface 270 may comprise one or more user input and output modules, and there may also be a module operating both as a user input module 280 and user output module 290, for example a touch screen display operating as a tactile user interface.

Apparatus 200 may further comprise a memory and/or storage 250. Memory/storage 250 may be connected to controller 210. Memory/storage 250 may store executable instructions that are configured to cause the apparatus 200 to perform various actions in co-operation with the control module 210. Memory/storage 250 may further include one or more databases, such as database 260 shown on FIG. 4. According to one example embodiment of the present invention, the memory/storage 250 maintains and/or stores information regarding predetermined criteria for triggering connectivity events for example in the form of one or more dedicated databases, such as the database 260 on FIG. 4. According to one example embodiment, example predetermined criteria for triggering a connectivity event comprises activation of a particular application, such as a multiplayer game, a Documents-To-Go application, and a document or object presenter application, to name a few non-limiting example applications. Activation of such an application may be initiated in response to a signal received via the user input 280 of the example apparatus 200, or invoked automatically by the apparatus 200 without user input based for example on determined context of the appratus 200. Alternatively, or in addition, predetermined criteria for triggering a connectivity event may comprise detection of a predetermined event or state within a certain application, such as selection of one or more data objects provided by an application. A non-limiting example for such an event or state being selection or highlighting of one or more images and/or media files from a gallery application that serves to present various media files stored within the apparatus 200.

According to one example embodiment of the present invention, the memory/storage 250 may further maintain information regarding one or more actions to be initiated in response to determination of an occurrence of a connectivity event. Such actions may comprise for example instructions for powering on the short-range communications module 230 and/or instructions for setting the short-range communications module 230 into device discovery mode. Depending on the embodiment, the device discovery mode may be associated with instructions to modify the short-range communications module 230 to utilize lowered transmission power to ensure that a responding device is within close proximity of the apparatus 200. The memory/storage 250 may further store a timer value associated with the device discovery mode so that the short-range communication module 230 may be instructed to remain in the device discovery mode until the associated timer value is expired and then return to for example idle state. Similarly, the timer value may be associated with the device discovery operation of the short-range communication module 230 with lowered transmission power device so that after timer value expiry the short-range communication module 230 may be instructed to return either to idle state or continue device discovery operation with normal transmission power.

Figure 5:
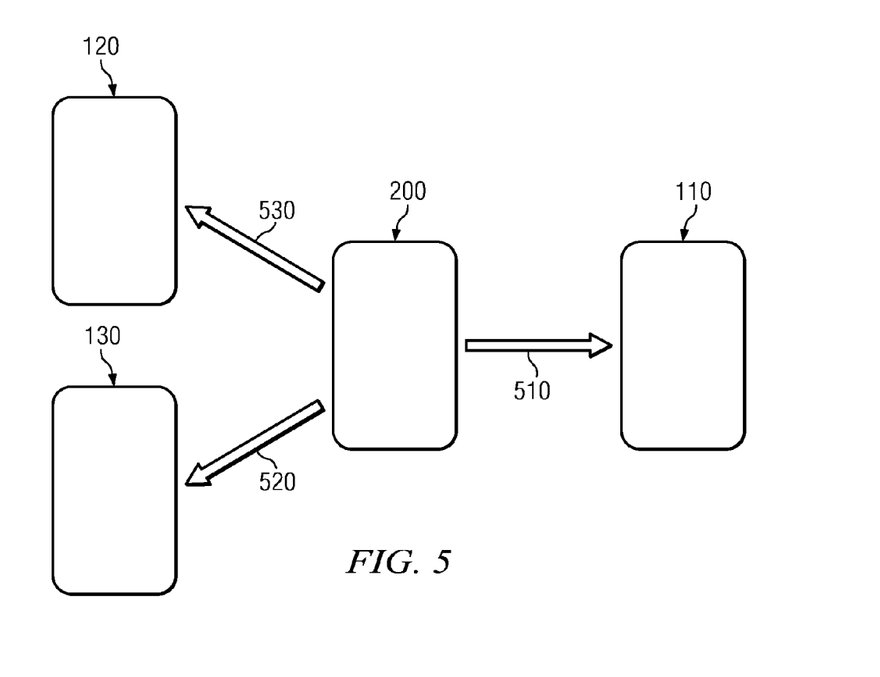
FIG. 5 illustrates an example short-range communication scenario in accordance with at least one example embodiment of the present invention.

FIG. 5 discloses an example short-range communication scenario according to one embodiment of the present invention, where apparatus 200 of FIG. 1 is within short-range communication range of the other apparatuses 110, 120 & 130 of FIG. 1. Apparatuses may all be capable of communicating utilizing same wireless short-range communication protocol, such as Bluetooth™. In an example usage scenario, apparatus 200 may trigger a short-range communications module, such as the Bluetooth™ radio modem to enter into a device discovery mode for transmitting device discovery messages in response to determining that the apparatus is actively operating an application satisfying predefined criteria for connectivity event. An example condition could be for example detecting that gallery application is a foreground application having input focus and presenting an image on display screen. Apparatus 200 may then initiate device discovery by transmitting one or more device discovery messages 510, 520 and 530, such as ID packets according to the Bluetooth™ protocol as discussed in connection with FIG. 2. The ID packets may be general inquiry access code packets (GIAC) or DIAC packets. Apparatuses 110, 120 and 130 that are within coverage may then receive these device discovery messages. It should be noted that although example FIG. 5 discloses device discovery messages 510-530 as separate messages for the sake of clarity, device discovery messages are broadcast transmission so that a single device discovery message may be received by one or more of the apparatuses 110, 120 and 130.

Figure 6A:
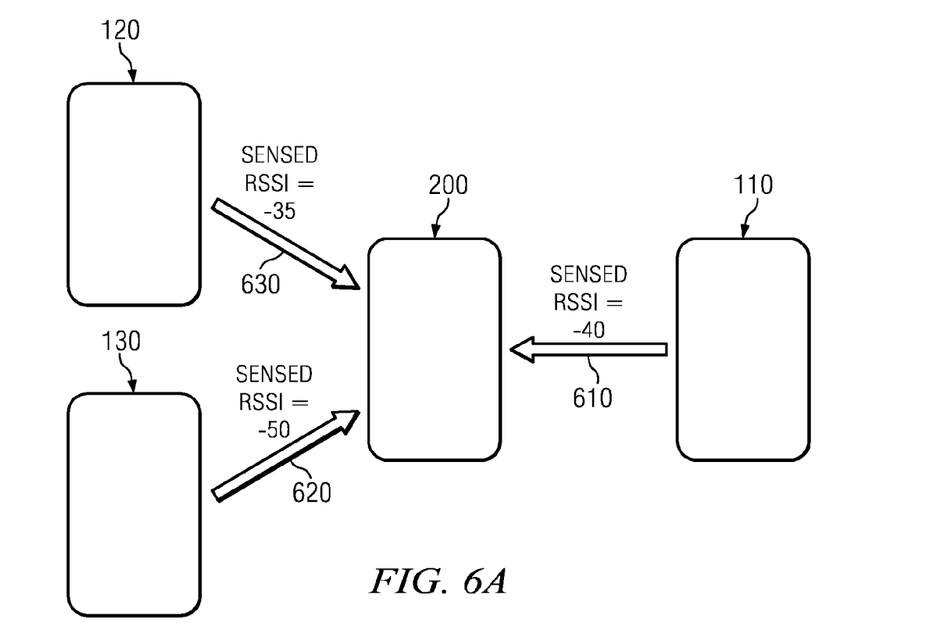
FIG. 6A illustrates an example short-range communication scenario in accordance with at least one example embodiment of the present invention.

Upon receipt of one or more device discovery messages, apparatuses 110, 120 and 130 may transmit response messages to the device discovery message as referred in example FIG. 6A as 610, 620 and 630. In particular, apparatuses 110 and 120 may respond with an Extended Inquiry Response (EIR), i.e. a Frequency Hop Synchronization (FHS) packet followed by an EIR packet as disclosed in connection with example FIG. 2, while apparatus 130 may only transmit an inquiry response (IR) including just a FHS packet.

According to one embodiment of the present invention, apparatus 200 may then determine whether any of the one or more response messages satisfy predetermined response criteria. Such criteria may comprise determination whether source device of the one or more response messages is within a close proximity of the apparatus 200. The proximity of the source device may be determined based on for example sensed signal strength of the received one or more response messages. The sensed signal strength may be set according to one example embodiment to RSSI values on or above −30 dBm. So, according to this example embodiment, sensing a response packet having −30 dBm will satisfy predetermined response criteria while sensing a response packet having −31 dBm will not satisfy the response criteria.

In the example of FIG. 6A, none of the received response messages satisfy the predetermined response criteria, so none of devices 110, 120 and 130 is determined to be within close proximity of apparatus 200. As illustrated in the example FIG. 6A, the sensed RSSI value for response message 610 is −40 dBm, −50 dBm for response message 620 and −35 dBm for response message 630. So, none of the response messages meet or exceed the threshold value of −30 dBm for satisfying the predetermined response criteria.

According to one embodiment of the present invention, it is possible to determine when apparatuses are being moved closer to each other to satisfy the predetermined response criteria. An example of such operation is disclosed in FIG. 6B, which illustrates the example short-range communication scenario of FIG. 6A in which apparatus 110 is now moved closer to apparatus 200. Similarly, apparatus 200 may be moved closer to apparatus 110. Now, as disclosed in connection with FIG. 6A, apparatus 200 initially received response messages that do not satisfy the predetermined response criteria. However, after apparatus 110 is moved within close proximity to apparatus 200, apparatus 200 registers one or more response messages from apparatus 110 that satisfies the predetermined response criteria, the sensed RSSI value for response message 610' being −25 dBm that exceeds the threshold value of −30 dBm for the predetermined response criteria.

Figure 6B:
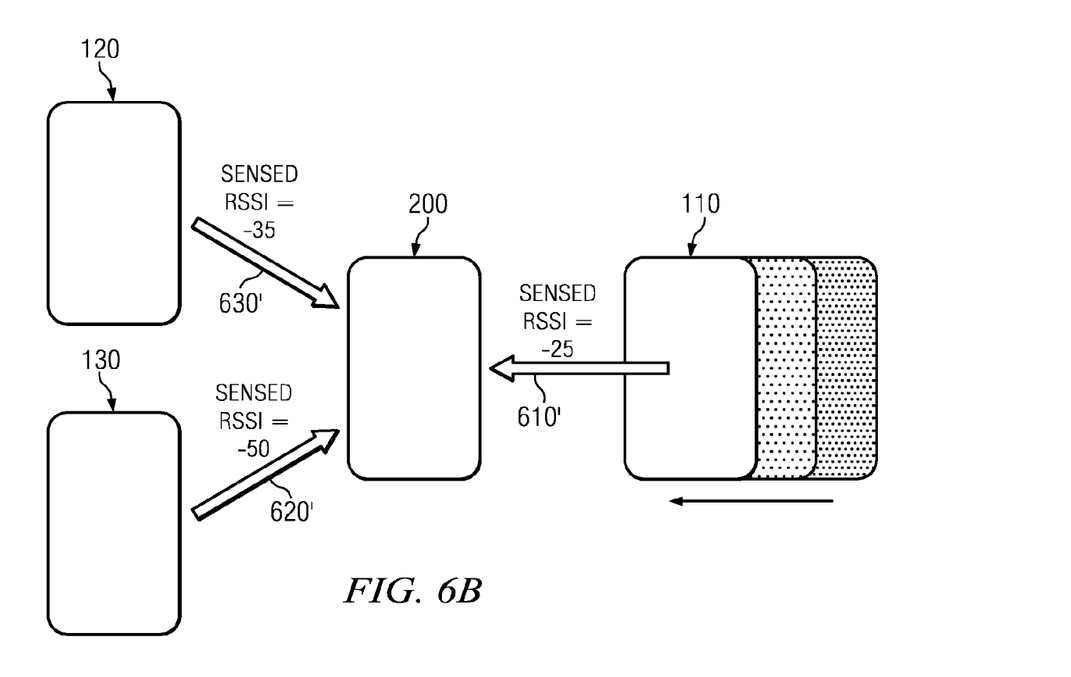
FIG. 6B illustrates an example short-range communication scenario in accordance with at least one example embodiment of the present invention.

According to one example embodiment of the present invention, example apparatus 200 may adjust transmission power level for the device discovery messages. With this property, device discovery signal propagation can be limited to shorter range, hence fewer devices receive inquiry message and thus fewer responses are expected to be received from the discoverable devices within the smaller range. For example, by setting transmission power to −20 dBm in connection with the Bluetooth™ example embodiment, the coverage area of the inquiry transmissions gets significantly smaller. According to one example embodiment, the transmission power of device discovery messages may be further powered down to a level where coverage of device discovery signals is within a couple of tens of centimeters. With such a device discovery mode, the probability that more than one device receives the device discovery messages gets small and there is no longer need to filter response messages based on received signal strength information first received response message could be selected as satisfying predetermined response criteria. Adjusting of the transmission power level of device discovery messages in connection with Bluetooth™ example may be provided with a dedicated Bluetooth™ Host Controller Interface (HCI) command: "HCI_Write_Inquiry_Transmit_Power_Level" as defined the existing *Bluetooth™ Core Specification, version* 4.0, published on Jun. 30, 2010 provided by Bluetooth™ Special Interest Group (SIG), accessible at www.bluetooth.org.

It may also be possible that responding apparatuses send transmission power information within the Bluetooth™ EIR packet. In instances where the transmission power information is available in the EIR packet, the predetermined response criteria may include an adjustable RSSI threshold value that accounts for the transmission power. For example, the threshold value may be set at 30 dBm below the EIR transmission power, so that if the transmission power level in an FHS packet is +20 dBm then the threshold value that will trigger selection will be the FHS packet being measured at −10 dB, or 30 dB below of transmission power level. Further, to ensure that apparatuses are maintained in close proximity, the predetermined response criteria may require that more than one Bluetooth™ FHS packet is sensed at or above a predefined threshold RSSI value. In addition, different thresholds could be used for different phases, for example, first the threshold value may be set above −45 dBm to select one or more candidate apparatuses and then second, finally deciding the threshold value may be set above −30 dBm Another example filtering factor for response criteria may be based on other information received in the response messages, such as capabilities and/or services that are available in a responding apparatus. For example, EIR packets may contain service level information, and so only responses above certain measured signal strength level and from device(s) capable of supporting certain types of Bluetooth™ services (e.g. RSSI above −30 dBm and OBEX file transfer supported) may be used as criteria for predetermined response criteria.

According to one embodiment, upon predetermined response criteria is met, one or more actions may be initiated at an apparatus, such as wireless communication device 200 of FIG. 1. The one or more actions may relate to wireless connection establishment with a source apparatus of the response messages meeting the response criteria and be dependent on the information received from the source apparatus in response to the transmitted device discovery messages. For example, a Bluetooth™ pairing procedure using a predetermined pairing code, such as "0000" may be initiated with the source apparatus in response to receiving manufacturing company and class of device information included in the Bluetooth™ FHS indicating that the source apparatus is e.g. a wireless headset from Nokia Corporation, which is not yet paired with the apparatus. Similarly, a communication connection may be initiated with a source apparatus in response to determining that the source device is a paired Bluetooth™ device that is not connected with the example apparatus 200. Alternatively, an ongoing communication connection with a source device may be disconnected in response to determining that response messages of the source device meet the predetermined response criteria.

Figure 7:
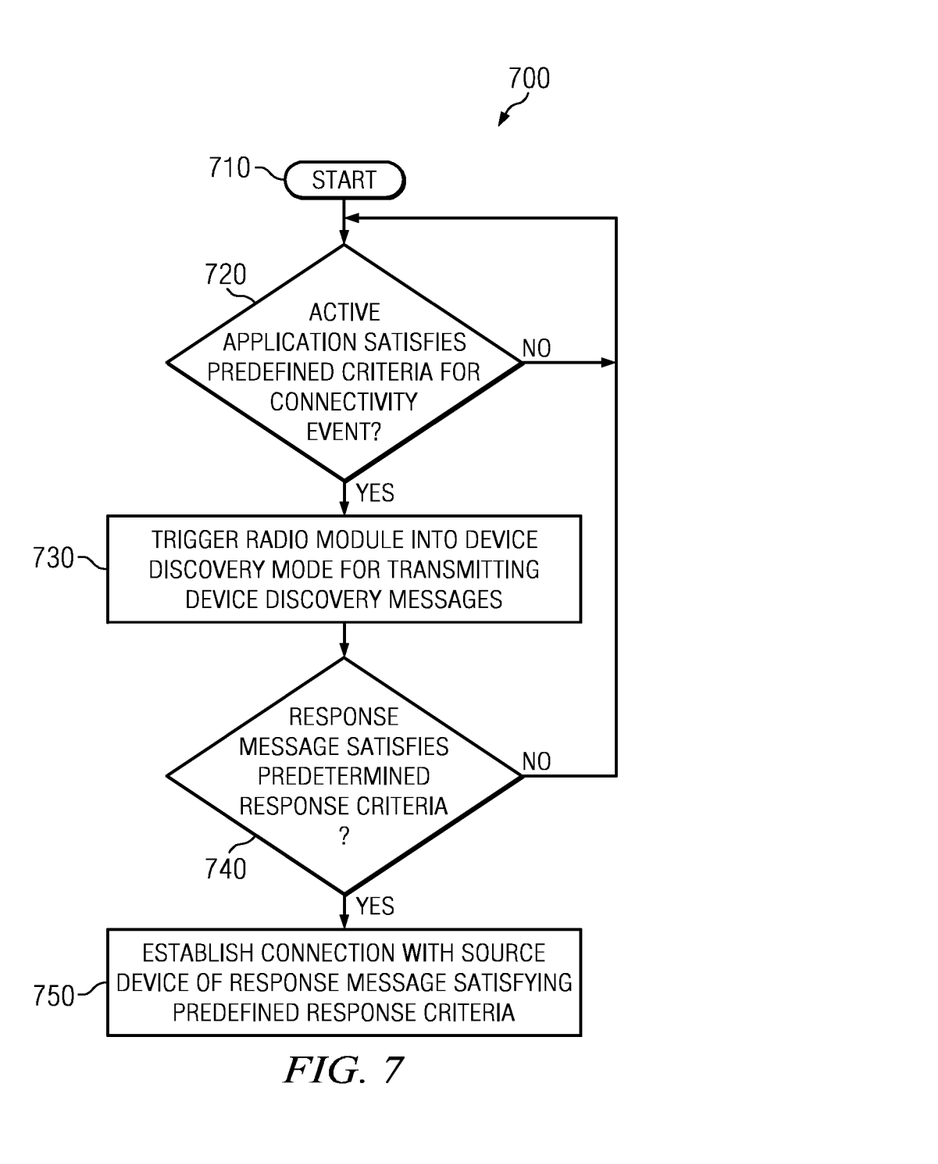
FIG. 7 illustrates an example flow diagram showing operations for for initiating one or more actions at an apparatus in response to detecting that an active application is in a predetermined state triggering a connectivity event.

FIG. 7 illustrates an example method 700 according to one embodiment of the present invention for initiating one or more actions at an apparatus in response to detecting that an active application is in a predetermined state triggering a connectivity event. The method may also be carried out in the form of a computer process defined by a computer program. The computer program may be in source code form, object code form, or in some intermediate form, and it may be stored in some sort of distributable or a non-distributable carrier, which may be any entity or device capable of carrying the program. Such carriers include a record medium, computer memory, read-only memory, electrical carrier signal, telecommunications signal, and software distribution package, for example. Depending on the processing power needed, the computer program may be executed in a single electronic digital processing unit or it may be distributed amongst a number of processing units.

Example method 700 starts with initiation block 710. In block 720 a determination is made whether an active application on example apparatus 200 satisfies predefined criteria for a connectivity event. The determination may be based on the entries maintained in the memory and/or storage 250 of the example apparatus 200. The entries may comprise information identifying applications and associated states for the applications, such as whether there is an active application that is in a state of presenting data, or the application is a foreground application having input focus. If predefined criteria for connectivity event are not satisfied, method 700 goes back to initiation block 710. If predefined criteria for connectivity event are satisfied, method 700 continues with block 730 where a short-range communication module 230, such as a Bluetooth™ radio modem of the example apparatus 200 is triggered to enter into a device discovery mode for transmitting device discovery messages for detecting one or more devices within the short-range communication coverage of example apparatus 200. Depending on the embodiment, the example apparatus 200 may adjust transmission power level for the device discovery messages in order ensure that only devices that are within close proximity of apparatus 200 responds to the device discovery messages.

Example method 700 may continue with block 740, where example apparatus 200 may receive one or more messages responding to the transmitted device discovery messages of block 730. At block 740, a determination is made whether any of the one or more response messages satisfy predetermined response criteria. The predetermined response criteria may comprise determination whether source device of the one or more response messages is within a close proximity of the apparatus 200. The proximity of the source device may be determined based on for example sensed signal strength RSSI of the received one or more response messages as disclosed in connection with FIGS. 6A and 6B. Alternatively, in connection with device discovery with lowered transmission power the response criteria may comprise simply receiving a response from a device capable of receiving the one or device discovery messages. If no response messages satisfying the predetermined response criteria are received within a certain period of time, method 700 goes again back to initiation block 710. Similarly, transmission of the device discovery messages may be ceased according to one example embodiment of the present invention in response to a predefined condition, such as detection that a user interface of example apparatus 200 is no longer illuminated. If the determination of block 740 indicates that at least one response message satisfying the predetermined response criteria is received, method 700 continues with block 750 where a communication connection is established with a source device of the one or more response messages satisfying the predetermined response criteria.

Without in any way limiting the scope, interpretation, or application of the claims appearing below, a technical effect of one or more of the example embodiments disclosed herein may be immediate connection establishment with another device, or exchange of information with another device when the other device is determined to be within a close proximity. Another technical effect of one or more of the example embodiments disclosed herein may be automatic triggering of a short-range communication module to initiate device discovery in response to determination that an active application satisfies predefined criteria for connectivity event.

Various operations and/or the like described herein may be executed by and/or with the help of computers. Further, for example, devices described herein may be and/or may incorporate computers. The phrases "computer", "general purpose computer", and the like, as used herein, refer but are not limited to a media device, a personal computer, an engineering workstation, a personal digital assistant, a portable computer, a computerized watch, a wired or wireless terminal, phone, node, and/or the like, a set-top box, a personal video recorder (PVR), an automatic teller machine (ATM), a game console, and/or the like.

Embodiments of the present invention may be implemented in software, hardware, application logic or a combination of software, hardware and application logic. The software, application logic and/or hardware may reside on a memory of apparatus 200 of FIG. 1. In an example embodiment, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 8. A computer-readable medium may comprise a computer-readable storage medium that may be any media or means that may contain or store the instructions for use by or in connection with an instruction execution system, apparatus, or device, such as a computer.

Figure 8:
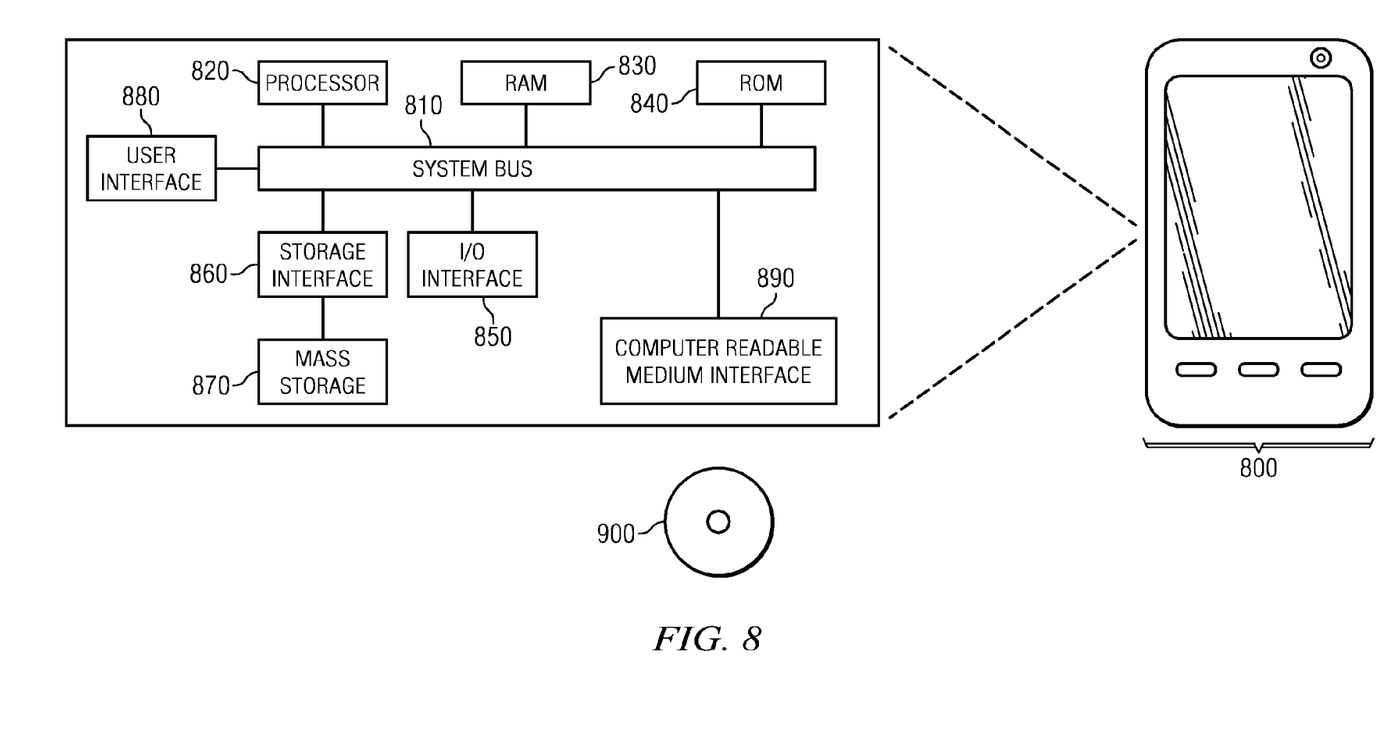
FIG. 8 discloses an apparatus comprising example hardware for implementing computer software instructions stored in the apparatus according to an example embodiment of the present invention.

The phrases "general purpose computer", "computer", and the like may also refer to one or more processors operatively connected to one or more memory or storage units, wherein the memory or storage may contain data, algorithms, and/or program code, and the processor or processors may execute the program code and/or manipulate the program code, data, and/or algorithms. Accordingly, example computer 800 as shown in FIG. 8 that may be considered as one embodiment of any of the apparatuses 110, 120, 130, 140 and 200 illustrated on FIG. 1 may include various hardware modules for causing the computer to implement one or more embodiments of the present invention. According to one example, the computer 800 include a system bus 810 which may operatively connect processor 820, random access memory (RAM) 830, read-only memory (ROM) 840 that may store for example a computer code for the computer 800 to perform on or more of the example methods illustrated on FIG. 7. The system bus 810 may further operatively connect input output (I/O) interface 850, storage interface 860, user interface 880 and computer readable medium interface 890. Storage interface 860 may comprise or be connected to mass storage 870.

Mass storage 870 may be a hard drive, optical drive, or the like. Processor 820 may comprise a microcontroller unit (MCU), a digital signal processor (DSP), or any other kind of processor. Computer 800 as shown in this example also comprises a touch screen and keys operating in connection with the user interface 880. In various example embodiments, a mouse, and/or a keypad may alternately or additionally be employed. Computer 800 may additionally include the computer readable medium interface 890, which may be embodied by a card reader, a DVD drive, a floppy disk drive, and/or the like. Thus, media containing program code, for example for performing method 700 of FIG. 7, may be inserted for the purpose of loading the code onto the computer.

Computer 800 may run one or more software modules designed to perform one or more of the above-described operations. Corresponding program code may be stored on a physical media 900 such as, for example, DVD, CD-ROM, and/or floppy disk. It is noted that any described division of operations among particular software modules is for purposes of illustration, and that alternate divisions of operation may be employed. Accordingly, any operations discussed as being performed by a software module may instead be performed by a plurality of software modules. Similarly, any operations discussed as being performed by a plurality of modules may instead be performed by a single module. It is noted that operations disclosed as being performed by a particular computer may instead be performed by a plurality of computers.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method comprising:
   triggering a radio module at an apparatus to enter into a device discovery mode for transmitting device discovery messages in response to determining that the apparatus is actively operating an application in a state of at least one of a foreground application, presenting content and highlighting selectable content;
   receiving one or more messages responding to the transmitted device discovery messages;
   determining whether any of the one or more response messages satisfy predetermined response criteria, the predetermined response criteria comprising determination that a source device of the one or more response messages is within a close proximity of the apparatus; and
   establishing a communication connection with a source device of the one or more response messages satisfying the predetermined response criteria.

2. A method according to claim 1, wherein the source device of the one or more response messages is determined to be within the close proximity of the apparatus when receiving two or more response messages from the source device at or above a predefined threshold signal strength level.

3. A method according to claim 1, wherein the communication connection is established automatically without manual user input.

4. A method according to claim 1, further comprising causing powering on of the radio module in response to determining that the apparatus is actively operating an application in the state of at least one of a foreground application, presenting content and highlighting selectable content.

5. A method according to claim 1, wherein a timer value is associated with the triggered device discovery mode of the radio module to cause ceasing the transmission of the device discovery messages when the timer value has elapsed.

6. A method according to claim 1, wherein the active application is a foreground application presented on a user interface of the apparatus.

7. An apparatus, comprising:
   at least one processor; and
   at least one memory including executable instructions, the at least one memory and the executable instructions being configured to, in cooperation with the at least one processor, cause the apparatus to perform at least the following:
      trigger a radio module to enter into a device discovery mode for transmitting device discovery messages in response to the determination that the apparatus is actively operating an application in a state of at least one of a foreground application, presenting content and highlighting selectable content;
      receive one or more messages responding to the transmitted device discovery messages;
      determine whether any of the one or more response messages satisfy predetermined response criteria, the predetermined response criteria comprising determination that a source device of the one or more response messages is within a close proximity of the apparatus; and
      establish a communication connection with a source device of the one or more response messages satisfying the predetermined response criteria.

8. An apparatus according to claim 7, wherein the source device of the one or more response messages is determined to be within the close proximity of the apparatus when receiving two or more response messages from the source device at or above a predefined threshold signal strength level.

9. An apparatus according to claim 7, wherein the communication connection is established automatically without manual user input.

10. An apparatus according to claim 7, wherein the at least one memory and the executable instructions being further configured to, in cooperation with the at least one processor, cause the apparatus to power on the radio module in response to determination that the apparatus is actively operating an application in a state of at least one of a foreground application, presenting content and highlighting selectable content.

11. An apparatus according to claim 7, wherein the at least one memory and the executable instructions being further configured to, in cooperation with the at least one processor, cause the apparatus to associate a timer value with the triggered device discovery mode of the radio module to cease the transmission of the device discovery messages when the timer value has elapsed.

12. An apparatus according to claim 7, wherein the active application is a foreground application presented on a user interface of the apparatus.

13. A computer program product comprising computer executable program code recorded on a non-transitory computer readable storage medium, the computer executable program code comprising:
   code configured to trigger a radio module of an apparatus to enter into a device discovery mode for transmitting device discovery messages in response to determination that the apparatus is actively operating an application in a state of at least one of a foreground application, presenting content and highlighting selectable content;

code configured to receive one or more messages responding to the transmitted device discovery messages;

code configured to determine whether any of the one or more response messages satisfy predetermined response criteria, the predetermined response criteria comprising determination that a source device of the one or more response messages is within a close proximity of the apparatus; and code configured to establish a communication connection with a source device of the one or more response messages satisfying the predetermined response criteria.

14. A computer program product according to claim 13, wherein the source device of the one or more response messages is determined to be within the close proximity of the apparatus when receiving two or more response messages from the source device at or above a predefined threshold signal strength level.

15. A computer program product according to claim 13, further comprising code configured to cause powering on of the radio module in response to determination that the apparatus is actively operating an application in a state of at least one of a foreground application, presenting content and highlighting selectable content.

16. A computer program product according to claim 13, further comprising code configured to cause a timer to be associated with the triggered device discovery mode of the radio module and a code configured to cease the transmission of the device discovery messages when the timer value has elapsed.

* * * * *